United States Patent [19]

Reinartz et al.

[11] Patent Number: 4,687,259
[45] Date of Patent: Aug. 18, 1987

[54] HYDRAULIC BRAKE SYSTEM WITH SLIP CONTROL

[75] Inventors: Hans D. Reinartz, Frankfurt am Main; Helmut Steffes, Eschborn, both of Fed. Rep. of Germany

[73] Assignee: Alfred Teves GmbH, Frankfurt am Main, Fed. Rep. of Germany

[21] Appl. No.: 732,241

[22] Filed: May 8, 1985

[30] Foreign Application Priority Data

May 9, 1984 [DE] Fed. Rep. of Germany ....... 3417018

[51] Int. Cl.$^4$ ............................................. B60T 8/44
[52] U.S. Cl. .................................. 303/114; 60/547.1; 188/181 R; 188/358; 303/52; 303/68; 303/119
[58] Field of Search .................. 303/114, 100, 92, 113, 303/119, 115, 91, 61–63, 68–69, 110, 50–56; 188/181, 355–360; 60/545, 547.1, 550, 552, 554

[56] References Cited

U.S. PATENT DOCUMENTS 4,340,257  7/1982  Belart .................................. 303/114
4,477,125 10/1984  Belart et al. ..................... 303/119 X Primary Examiner—Douglas C. Butler
Attorney, Agent, or Firm—James B. Raden; William J. Michals

[57] ABSTRACT

A hydraulic brake system with slip control for automotive vehicles comprising a master cylinder (2) pressurizable by a hydraulic power booster (1), in which system valve(s) (31,27,32,28,33,23) are inserted between the master cylinder (2) and the wheel brakes (29,30,24,25) connected to the master cylinder (2) which allow pressure fluid removal from the wheel brakes (29,30,24,25) that can be replenished out of the pressure chamber (19) of the hydraulic power booster (1) by way of a change-over valve (36). A stroke limitation of the brake pedal (8) is effected during slip control. The end surface of the master cylinder piston (5) close to the working chamber (16) being larger than the is effective surface of the booster piston (4), and wherein a stepped piston is employed as master cylinder piston (5) with an annular surface (18) thereof being adapted to be acted upon in the actuating direction by the pressure prevailing in the working chamber (16). A non-return valve (37, 38) is connected to the change-over valve (36) normally assuming its closed position through which the wheel brakes (29,30,24,25) can reacted upon directly by the pressure prevailing in the pressure chamber (10) of the hydraulic power booster (1).

1 Claim, 2 Drawing Figures

HYDRAULIC BRAKE SYSTEM WITH SLIP CONTROL

BACKGROUND OF THE INVENTION

The present invention relates to a hydraulic brake system with slip control for automotive vehicles comprising a master cylinder pressurizable by a hydraulic power booster, in which system valve means are inserted between the master cylinder and the wheel brakes connected to the master cylinder. The valve means allow removal of pressure fluid from the wheel brakes that can be replenished out of the pressure chamber of the hydraulic power booster by way of a change-over valve. A stroke limitation of the brake pedal is effected during slip control and the end surface of the master cylinder piston close to the working chamber is larger than the effective surface of the booster piston. A stepped piston is employed as the master cylinder piston, an annular surface thereof being adapted to be acted upon in the actuating direction by the pressure prevailing in the working chamber.

Such systems are known from German Pat. No. P3338249.2 which corresponds to copending U.S. patent application Ser. No. 660,469, filed Oct. 9, 1984. An essential component in the patent application is a braking pressure generator which is substantially composed of tandem master cylinder actuatable by a hydraulic power booster. For this purpose, the hydraulic power booster includes a brake valve by which a pressure is adjustable in the pressure chamber of the hydraulic power booster which is proportional to the actuating force respectively exerted on the brake pedal. As previously alluded to, wheel brakes are connected to the working chambers of the tandem master cylinder, one normally opened multi-directional control valve and one normally closed multi-directional control valve being allocated to each wheel brake. The normally opened multi-directional control valve is disposed in the flow path between the working chamber of the tandem master cylinder and the wheel brake, while pressure fluid is removed from the wheel brake through the normally closed multi-directional control valve if the normally opened multi-directional control valve was switched to its closed position by slip control electronics.

For supplying the hydraulic power booster with pressure, a hydropneumatic pressure accumulator is employed which is normally maintained at a predeterminable pressure level by a hydraulic pressure fluid pump and by corresponding pressure monitors. Connected to the pressure chamber of the hydraulic power booster is a three-way/two-position directional control valve which is adapted to be switched over by slip control electronics and which receives an electrical control command as soon as a critical slip condition occurs at one or more of the vehicle wheels allocated to the vehicle brakes. After the three-way/two-position directional control valve adapted to be activated by the slip control electronics has been switched over, the working chambers of the tandem master cylinder will communicate by way of sealing sleeves with the pressure chamber of the hydraulic power booster. This enables pressure fluid that was removed from the wheel brakes during slip control to be replenished out of the pressure chamber of the hydraulic booster.

Further components of the brake system described in the above-referenced patent application are two two-way/two-position directional control valves which are hydraulically actuatable and which will change their switch position as soon as there is changing-over of the three-way/two-position directional control valve connected to the pressure chamber of the hydraulic power booster. In this arangement, one of the hydraulically actuatable two-way/two-position directional control valves is connected to a chamber of the braking pressure generator with the chamber being confined by the housing and the master cylinder piston designed as a stepped piston. When the respective two-way/two-position directional control valve is changed over, the chamber referred to hereinabove will be shut off hydraulically. During control action, a hydraulic connection can be established by way of the other two-way/two-position directional control valve between a housing port of the tandem master cylinder and the unpressurized supply reservoir. As a result, during control action, the master cylinder piston designed as a stepped piston is caused to slide back in opposition to the actuating direction up to a predefinable axial position by virtue of pressurization of the master cylinder chambers.

As explained, pressurization of the wheel brakes during slip control takes place in each case dynamically by way of master cylinder sleeves inserted upstream of the master cylinder chambers. Alternatively the sleeves oppose a specific resistance to the volume flow of the brake fluid, and impair the proper function of the device—such as due to wrong assembly.

Therefore, it is an object of the present invention to simplify a hydraulic brake system with slip control of the type referred to and to increase its operational reliablity.

SUMMARY OF THE INVENTION

This object is achieved by the present invention in that connected to the change-over valve which normally assumes its closed position, and to the wheel brakes is at least one non-return valve through which the wheel brakes can be acted upon directly by the pressure prevailing in the pressure chamber of the hydraulic power booster. Thus, during control action, the dynamic pressurization of the wheel brakes is effected by circumvention of the sleeve seals arranged in the master cylinder so that greater operational reliability is ensured. As a non-return valve, a standard component part can be employed. An advantageous embodiment of the invention for a two-way/two-position directional control valve which normally assumes its opened position to be connected upstream of the working chamber of the master cylinder. The valve prevents in its operating position the escape of pressure fluid from the working chamber. A similar embodiment provides a working chamber that is shut off hydraulically during control, while the delivery of dynamic pressure to the wheel brakes of the hydraulic brake system is performed solely by way of the non-return valve connected to the change-over valve. Hydraulic isolation of the working chamber of the master cylinder ensures that the brake pedal will not move through its full travel when applied during slip control and that a minimum fluid reserve remains enclosed in the working chamber of the master cylinder in any case. When in its operating position, the two-way/two-position directional control valve will perform the function of a non-return valve so that medium flowing out of the pressure chamber of the hydraulic power booster through the change-over valve into the brake system is allowed to enter unhindered into the working chamber of the master cylinder.

In a preferred embodiment, the hydraulic power booster includes first and second ball seat valves connected between the pressure chamber and a pressurized fluid supply reservoir. The first and second ball seat valves are responsive to the pedal for metering fluid from the pressurized fluid supply at a pressure level proportional to actuating force applied to the pedal.

In a further improvement a master cylinder is provided which accommodates two working chambers, each of the working chambers communicating with wheel brakes of a brake circuit and a number of non-return valves are connected to the change-over valve corresponding to the number of brake circuits. Preferably, the two-way/two position directional control valve is switchable to its operating position when the change-over valve is actuated. In this respect, the two-way/two-position directional control valve is controllable by hydraulic pressure and the control port of the two-way/two-position directional control valve is connectable with the pressure chamber of the hydraulic power booster by way of the change-over valve.

BRIEF DESCRIPTION OF THE DRAWINGS

Various embodiments of the present invention will be described in more detail hereinbelow with reference to the accompanying drawing, wherein.

DETAILED DESCRIPTION

Figure 1:
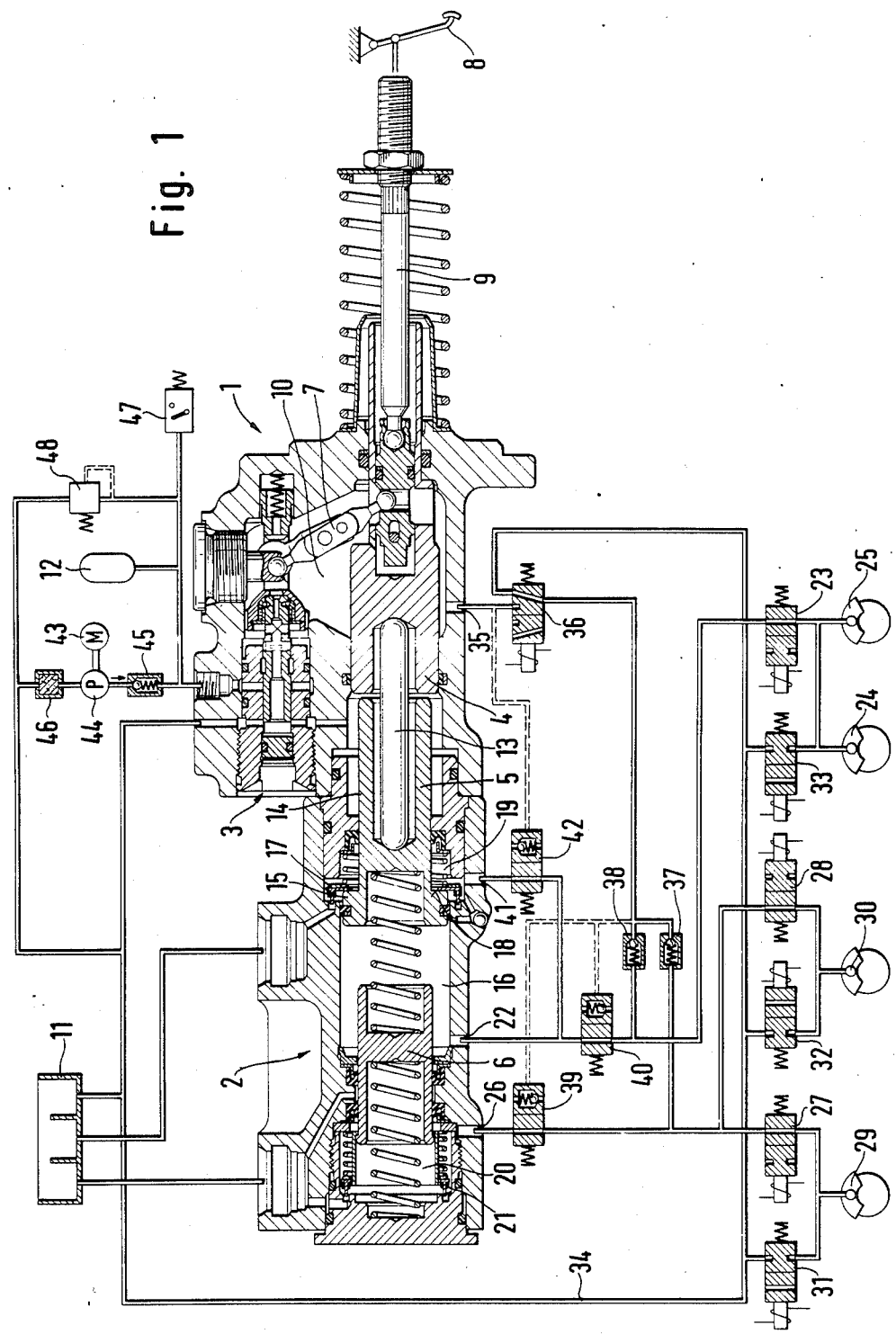
FIG. 1 is a hydraulic brake system with a braking pressure generator shown in cross section.

In the drawing, in which like parts have been assigned like reference numerals, reference numeral 1 designates a hydraulic power booster by which a tandem master cylinder 2 is actuatable. The hydraulic power booster 1 comprises a brake valve 3 which is located substantially in parallel to the axis of a booster piston 4 and of master cylinder pistons 5, 6 respectively. By way of a lever actuation 7, the brake valve 3 is connected to a push rod 9 coupled to a brake pedal 8. Moreover, the hydraulic power booster 1 includes a pressure chamber 10 which communicates by way of the brake valve 3 with an unpressurized supply reservoir 11 in the brake's release position. When the brake pedal 8 is applied with force, pressure fluid flows from a hydropneumatic pressure accumulator 12 into the pressure chamber 10 of the hydraulic power booster 1 so that pressure proportional to the actuating force will develop in the pressure chamber 10.

The master cylinder piston 5 is arranged coaxially in relation to the booster piston 4 and is slidable in the actuating direction by a rod 13 disposed between the pistons 5, 4.

The master cylinder piston 5 is designed as a stepped piston, the piston step 14 of smaller diameter showing to the booster piston 4, while the piston step 15 of larger diameter confines a working chamber 16 of the master cylinder 2. The working chamber 16 is normally in communication with the unpressurized supply reservoir 11 by way of a travel-responsively actuatable valve 17. Between the piston steps 14, 15, the master cylinder piston 5 disposes of an annular surface 18 which confines an annular chamber 19. The master cylinder piston 6 is arranged coaxially relative to the pistons 4, 5 and is slidable hydraulically in the actuating direction by a pressure developing in the working chamber 16. Said master cylinder piston 6 confines a second working chamber 20 which, in the brake's release position, governs a connection to the unpressurized supply reservoir 11 through a valve 21 which, in respect of design and function, corresponds to the valve 17.

Terminating into the first working chamber 16 is a housing port 22, to which wheel brakes 24, 25 are connected by way of an electromagnetically actuatable two-way/two-position directional control valve 23, the said wheel brakes being for instance those disposed at the rear axle of an automotive vehicle. Communicating with the working chamber 20 of the master cylinder 2 is a housing port 26, to which wheel brakes 29, 30 are connected by way of electromagnetically actuatable two-way/two-position directional control valves 27, 28, the said wheel brakes being for instance those disposed at the front axle of the automotive vehicle. Connected to the wheel brakes 24, 25, 29, 30 are further two-way/two-position directional control valves 31, 32, 33 which latter are controllable electromagnetically by a non-illustrated slip control electronics and which normally assume their closed position. Connected to the electromagnetically actuatable two-way/two-position directional control valves 31, 32, 33 is one joint return line 34 which leads to the unpressurized supply reservoir 11. An appropriate change-over of the two-way/two-position directional control valves 31, 27, 32, 28, 33, 23 allocated to the wheel brakes 29, 30, 24, 25 will enable to keep constant or likewise to decrease the pressure in each wheel brake 29, 30, 24, 25 independently of the pressures prevailing in the working chambers 16, 20, whereby an imminent locked condition can be averted.

Connected to a housing port 35 which is in hydraulic communication with the pressure chamber 10 of the hydraulic power booster 1 is a change-over valve 36 designed as a three-way/two-position directional control valve and controllable by the slip control electronics not shown. Connected to the outlet of the change-over valve 36 are two non-return valves 37, 38 which, in turn, are connected to the inlets of the electromagnetically actuatable two-way/two-position directional control valves 27 28. Between the housing ports 26, 22 or, respectively, the working chambers 20, 16 of the tandem master cylinder 2 and the inlets of the electromagnetically actuatable two-way/two-position directional control valves 27, 28, there are connected in addition two-way/two-position directional control valves 39, 40 which normally adopt a position providing open passage. The two-way/two-position directional control valves 39, 40 are controllable by hydraulic pressure and will be changed over by the action of the pressure prevailing in each case in the pressure chamber 10 of the hydraulic power booster, as soon as the change-over valve 36 is activated. In the operating position of the two-way/two-position directional control valves 39, 40, non-return valves within said valves are effective so that propagation of a volume flow between the working chambers 16, 20 of the tandem master cylinder 2 and the wheel brakes 29, 30, 24, 25 is precluded.

The tandem master cylinder 2 disposes of another housing port 41 communicating whereto is a two-way/two-position directional control valve 42, the design of which corresponds to that of the valves 39, 40. The two-way/two-position directional control valve 42, too, normally assumes an opened position in which there is hydraulic communication between the annular chamber 19 and the working chamber 16 of the tandem master cylinder 2. Moreover, said two-way/two-position directional control valve will adopt its operating position as soon as a hydraulic pressure will be adjusted in the pressure chamber 10 of the hydraulic power booster 1; this will take place irrespective of the activation of the change-over valve 36.

As is further depicted in FIG. 1, the hydropneumatic pressure accumulator is charged by way of a non-return valve 45 by a pressure fluid pump 44 which can be driven by an electric motor 43. For this purpose, the suction side of the pump is, by way of a filter element 46, in communication with the unpressurized supply reservoir 11. Switching on and off of the electric motor 43 will be carried out by a pressure monitor 47, while the pressure which can be built up maximally in the pressure accumulator 12 is limited by a safety valve 48.

The mode of operation of the brake system described will be explained in more detail hereinbelow, starting from the brake's release condition in which no actuating force is applied on the brake pedal 8 and all parts assume their position to be seen in the drawing. When an actuating force is exerted on the brake pedal 8, the pressure chamber 10 of the hydraulic power booster 1 will first be isolated from the unpressurized supply reservoir by the brake valve. After a predefined actuating travel, pressure fluid out of the hydropneumatic pressure accumulator 12 will be metered by way of the brake valve into the pressure chamber 10, the pressure prevailing in the pressure chamber 10 being in each case proportional to the actuating force applied on the brake pedal 8. After the hydraulic pressure in the pressure chamber 10 of the hydraulic power booster has exceeded a specific level, the booster piston 4 will move to the left when viewing in the drawing, the said movement of the booster piston 4 being transmitted by way of the rod 13 onto the master cylinder piston. After a small travel of the master cylinder piston 5, the valve 17 will close and thereby isolate the working chamber 16 of the tandem master cylinder 2 from the unpressurized supply reservoir 11. That is to say, when the valve 17 is closed, further displacement of the master cylinder piston 5 in the actuating direction has as a consequence that hydraulic pressure develops in the working chamber 16 of the tandem master cylinder which finally causes hydraulic displacement of likewise the master cylinder piston 6 in the actuating direction. Hence follows that pressure development takes place in the second working chamber 20 of the master cylinder 2, too, when the valve 21 is closed. The hydraulic pressures generated in the working chambers 16, 20 are fed to the wheel brakes 29, 30, 24, 25 so that the vehicle will be slowed down.

As the two-way/two-position directional control valve 42 changes over as soon as a corresponding pressure has developed in the pressure chamber 10 of the hydraulic power booster, the working chamber 16 will be isolated from the annular chamber 19 so that the pedal-remote end surface of the larger piston step 15 of the master cylinder 5 is responsible for the pressure generation in the working chamber 16 or in the working chamber 20, respectively.

When the non-illustrated slip control electronics recognizes a critical slip value at one or at more of the monitored vehicle wheels, first the change-over valve 36 will switch to its operating position so that pressure fluid out of the pressure chamber 10 of the hydraulic power booster 1 may propagate to the inlets of the non-return valves 37, 38 and, respectively, to the control ports of the hydraulically actuatable two-way/two-position directional control valves 39, 40. Subsequently, the valves 39, 40 will be changed over, thus precluding a pressure fluid flow out of the working chambers 16, 20 to propagate to the wheel brakes 29, 30, 24, 25.

It shall be assumed now that the vehicle wheel allocated to the wheel brake 30 displays a critical slip value. Consequently, the slip control electronics not illustrated in the drawings will switch the two-way/two-position directional control valve 28 to assume its closed position, as a result whereof the pressure in the wheel brake 30 remains constant irrespective of the pressure in the working chamber 16 of the tandem master cylinder and of the pressure prevailing in the pressure chamber 10 of the hydraulic power booster 1. In case a like phase of maintaining the pressure constant does not suffice to bring about re-acceleration of the vehicle wheel allocated to that vehicle brake, likewise the two-way/two-position directional control valve 32 will be switched over so that pressure fluid is removed from the wheel brake 30, the braking pressure decreasing thereby. Pressure fluid that has been taken from the wheel brake 30 this way will be replenished out of the pressure chamber 10 of the hydraulic power booster by way of the opened change-over valve 36 and the non-return valve 37. Simultaneously, the pressure built up in the pressure chamber 10 of the hydraulic power booster 1 will propagate by way of the two-way/two-position directional control valves 39 into the working chambers 16, 20 of the tandem master cylinder 2 so that stroke limitation of the master cylinder pistons 5, 6 will be effected. This is in first place caused by the fact that the end surface of the master cylinder 5 close to the working chamber 16 of the tandem master cylinder 2 has a larger effective surface than the booster piston 4.

If the auxiliary pressure supply of the brake system described fails, it will be aimed at to develop an amount of pressure in the working chambers 16, 20 of the tandem master cylinder which is sufficient for obtaining the minimum braking effect by means of applying a lowest possible actuating force on the brake pedal 8.

In such a fail condition, no hydraulic pressure will develop in the pressure chamber 10 of the hydraulic power booster 1. This maintains the two-way/two-position directional control valve 42 permanently in its opened position, a connection being established thereby between the annular chamber 19 and the working chamber 16 of the tandem master cylinder. Now exclusively the cross-sectional surface of the smaller piston step 14 of the master cylinder 5 will be responsible for the pressure development in the working chamber 16 of the tandem master cylinder 2 so that sufficient braking pressure can be built up in the working chamber 16 or, respectively, in the working chamber 20 of the tandem master cylinder with a relatively larger actuating travel. Likewise the hydraulically controllable two-way/two-position directional control valves 39, 40 remain in their position to be seen from the drawing so that there is always safeguarded free passage between the working chambers 16, 20 of the tandem master cylinder 2 and the wheel brakes 29, 30, 24, 25.

Besides, a like fail condition will be recognized by the slip control electronics not to be gathered from the drawings so that likewise the electromagnetically actuatable multi-directional control valves 36, 31, 27, 32, 28, 33, 23 will not change their switch positions discernible from the drawings.

Figure 2:
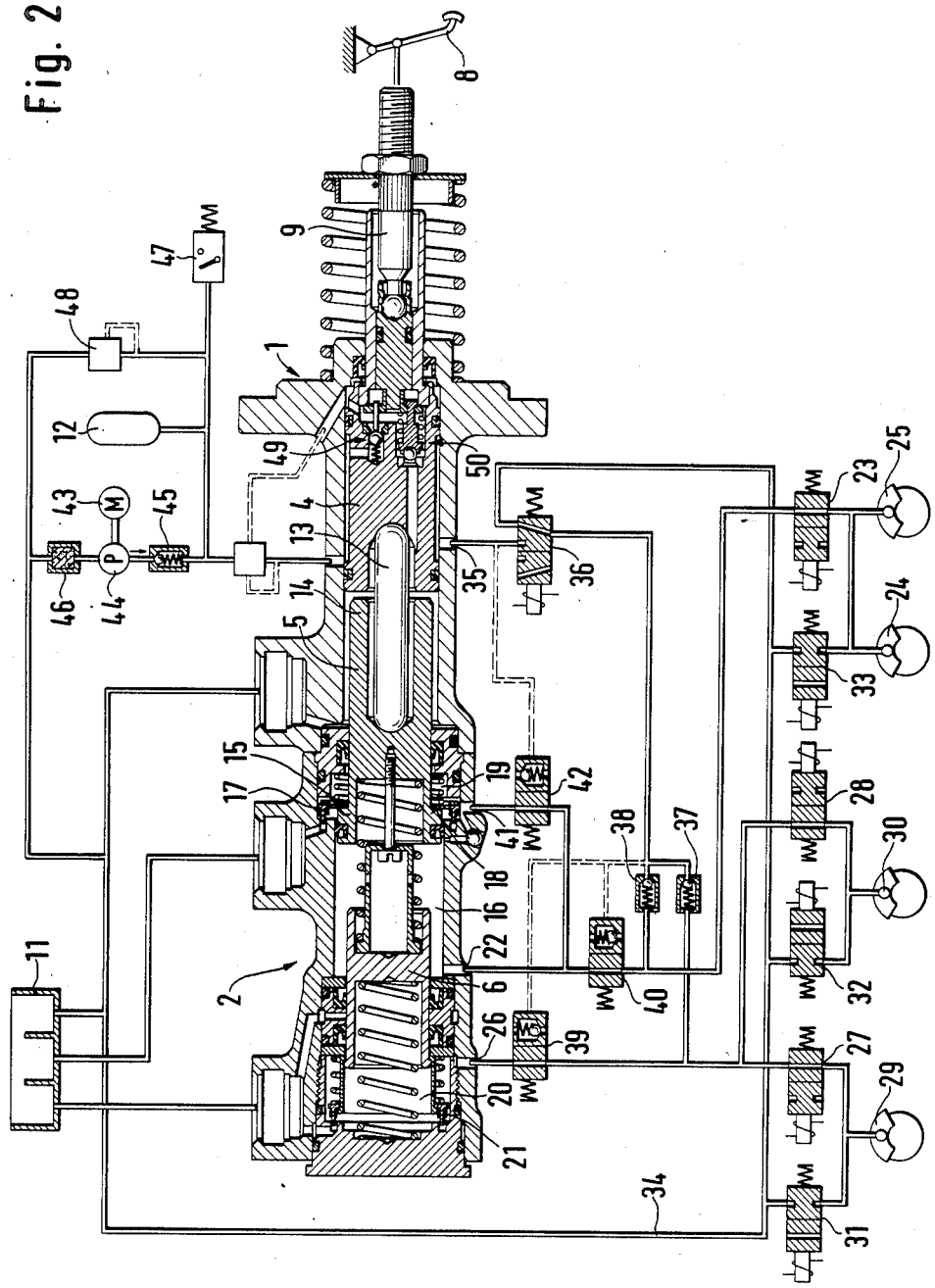
FIG. 2 is a hydraulic brake system with a hydraulic power booster, in cross section, varied in comparison with FIG. 1.

In the embodiment illustrated in FIG. 2 the brake valve shown in FIG. 1, which permits to meter pressure proportional to the pedal force into the pressure chamber 10 of the hydraulic power booster, is replaced by a valve assembly comprising two ball set valves 49, 50. In all other respects, the function of the brake system illustrated in FIG. 2 is completely identical with the above description.

What is claimed is:

1. A hydraulic brake system with slip control for automotive vehicles, having vehicle wheels said system comprising, in combination:
    a master cylinder having a working chamber therein;
    a plurality of wheel brakes respectively associated with said vehicle wheels;
    a plurality of pressure fluid lines respectively connecting said working chamber of said master cylinder to said wheel brakes;
    a pedal-operated hydraulic power booster for actuating said master cylinder in response to a brake pedal, said power booster having a pressure chamber therein;
    an unpressurized fluid supply reservoir which communicates with said pressure chamber in brake release position of said brake pedal;
    a plurality of normally open control valves respectively provided in said pressure fluid lines;
    a plurality of normally closed drain valves respectively hydraulically connected between said wheel brakes and said unpressurized fluid supply reservoir;
    a three-way/two-position directional control valve connected between said pressure chamber, said pressure fluid lines and said unpressurized fluid supply reservoir to alternately connect said pressure chamber to said pressure fluid lines or said unpressurized supply reservoir in response to a slip control signal; and,
    first and second non-return valves with each non-return valve being connected between said directional control valve and one of said pressure fluid lines, said non-return valves being connected to provide unidirectional pressure fluid flow from said directional control valve to said pressure fluid lines, wherein said hydraulic power booster includes first and second ball seat valves connected between said pressure chamber and a pressurized fluid supply reservoir, said first and second ball seat valves being responsive to said pedal for metering fluid from said pressurized fluid supply at a pressure level proportional to actuating force applied to said pedal.

* * * * *